United States Patent Office

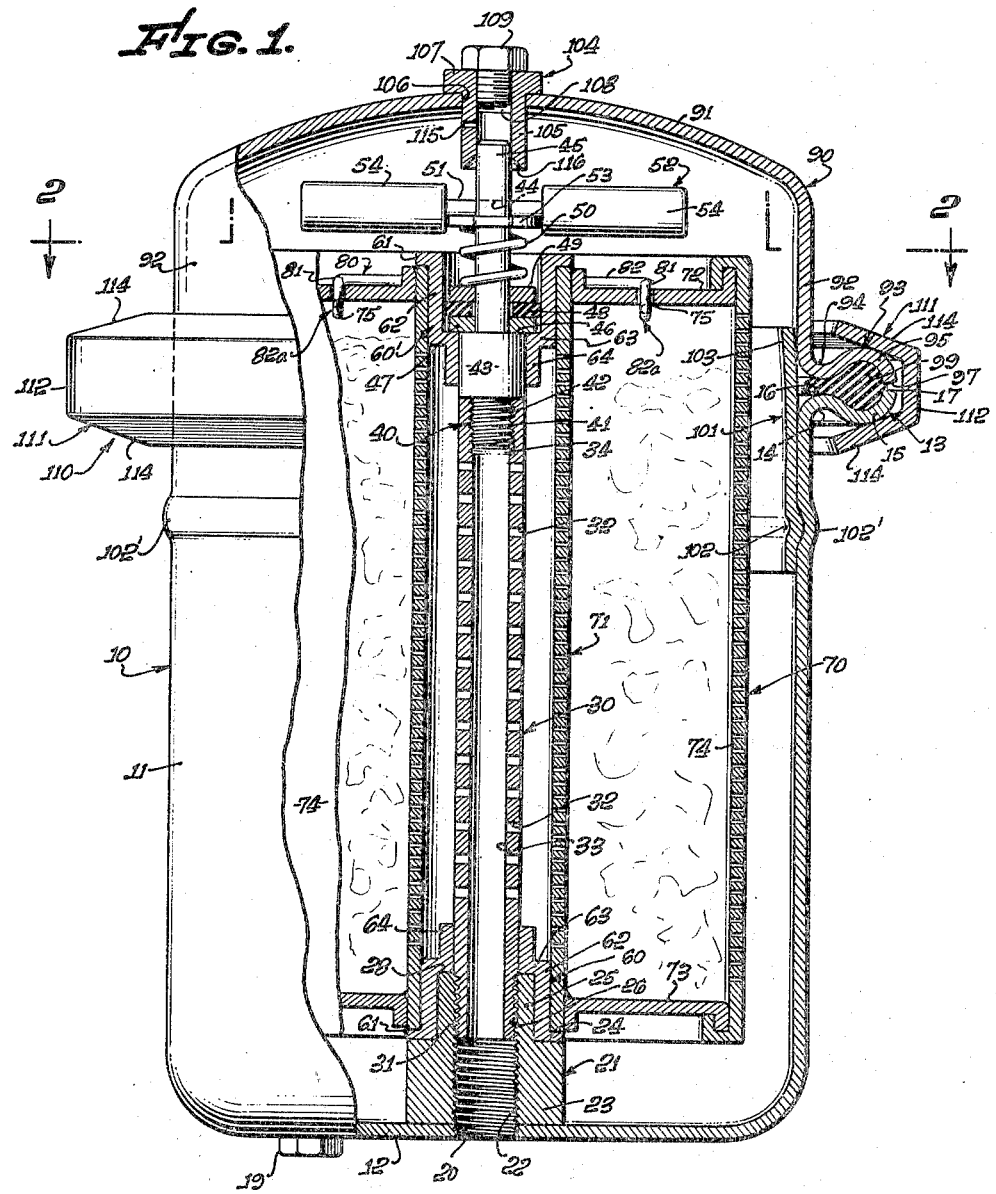

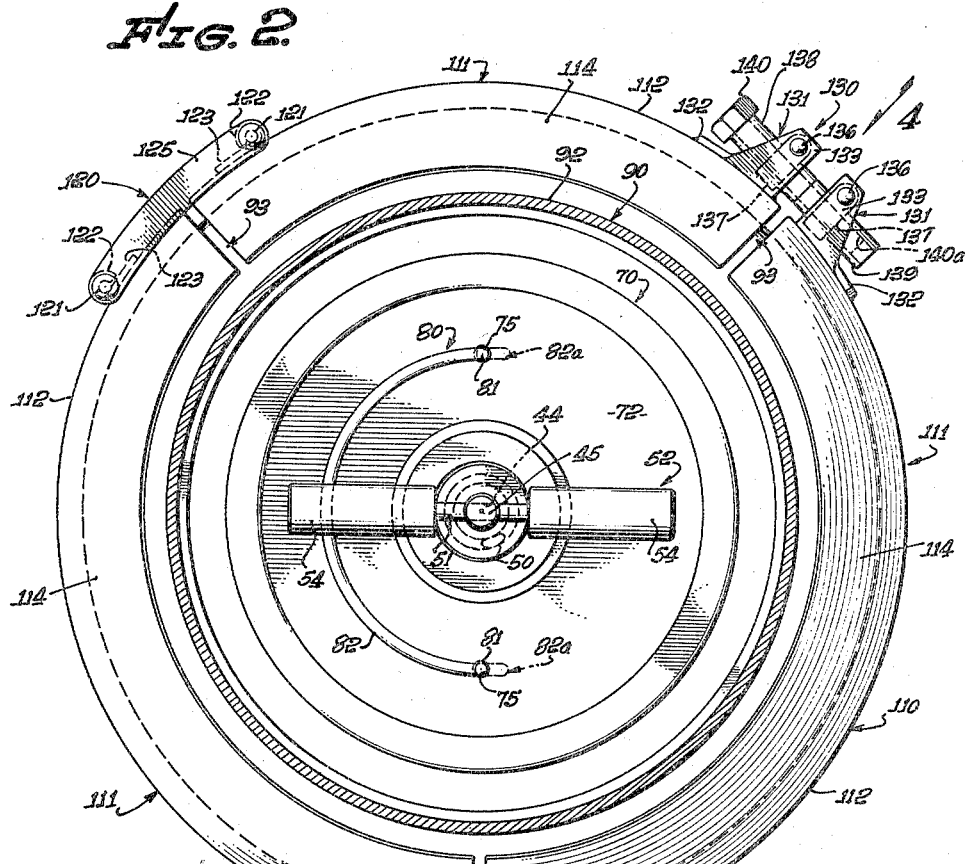
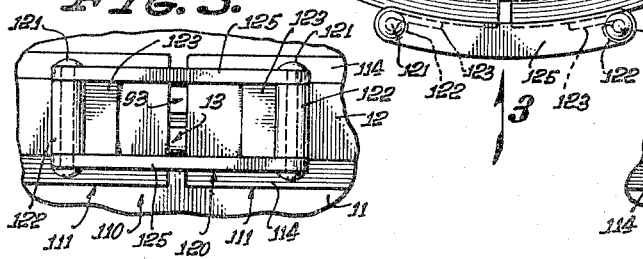
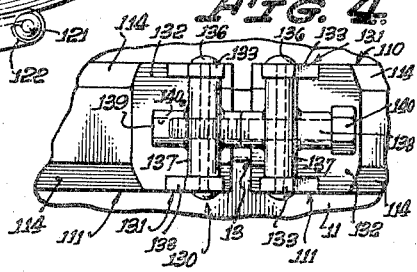
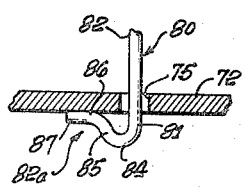
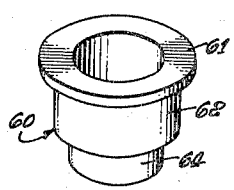

2,709,524
Patented May 31, 1955

2,709,524

FLUID FILTER

John K. Russell, Los Angeles, and Walter W. Boggs, Downey, Calif., assignors to Luber-Finer Incorporated, Los Angeles, Calif., a corporation of California Application September 24, 1953, Serial No. 382,068

9 Claims. (Cl. 210—131)

The present invention relates to a new and improved variety of improved filter construction. More specifically, it relates to a new and improved type of fluid filter construction which can be used easily and conveniently under a variety of conditions.

It is an object of the present invention to produce a new and improved fluid filter. A further object is to produce a device of the class described which is extremely efficient, which can be used under a variety of conditions without difficulty and which is relatively easy to manufacture.

A still further object of the present disclosure is to teach the production of an improved type of retaining band and flange construction for holding two elements together in a pressure-tight fluid-seal relationship. A further object is to teach the production of a new and improved type of washer capable of sealing cylindrical tubular elements against fluid leakage.

A still further object of the invention is to teach a new and improved type of bail fastener. More specifically, it is an object to produce a bail fastener which can be easily and conveniently inserted within a flat end of a container and which, once in place, is locked in position and is only capable of being moved from a closed position against the container to which it is attached to an open position for use in carrying this container.

Inasmuch as all of the elements specifically indicated in the above paragraphs are designed primarily for use with fluid filters, such as for example, fluid filters utilized in filtration of oil as in a car, truck, tractor or stationary engine oil pipe lines, etc., it is a still further object of the present invention to utilize the sealing band construction referred to above, the washer construction referred to above, and the bail construction indicated either alone or in combination with one another in the production of an extremely effective fluid filter in which there is little, if any, danger of fluid leakage regardless of the use of pressure within such devices.

A closely related object of the invention is to produce a filter of the class described in which the individual elements may be quickly and easily disassembled by virtue of the specific constructions indicated and in which the filter cartridge used may be rapidly replaced with a minimum of effort.

Still further objects or aims of the present invention will be apparent from the following specification, including the accompanying claims. Perhaps the construction of the invention will be more fully apparent with reference to the accompanying drawings, in which:

Fig. 1 shows a partial sectional view of a fluid filter of the present invention;

Fig. 2 shows a sectional view taken at line 2—2 of Fig. 1;

Fig. 3 illustrates a partial view taken in the direction of the arrow 3 shown in Fig. 2;

Fig. 4 shows a partial view taken in the direction of the arrow 4 in Fig. 2;

Fig. 5 is a partially sectional view showing the new bail fastener of the present invention in an upward position; and Fig. 6 is an isometric view of the new sealing washer of the invention.

For convenience, like numerals are used to illustrate like parts of all figures of the drawing.

In Fig. 1 of the drawing, it is seen that the new filter of the present invention consists essentially of a cylindrical housing 10 having a side wall 11, a lower bottom wall 12, an upper end 16, and an upper top curved flange assembly 13 which projects beyond the wall 11 and contains a first curved portion 14, curved away from the wall 11, and a second curved portion 15 opening upward in the same direction as the upper end 16 of the housing 10. Positioned within the bottom 12 of the housing 10 is an inlet 19 and a centrally placed outlet cylindrical opening 20. Surrounding the opening 20 within the housing 10 is an upstanding boss 21 having a center tapped section 22 aligned with the opening 20 and surrounded by a cylindrical boss 23 providing a first annular shoulder 24 removed from the base 12. This shoulder is provided with an upstanding cylindrical portion or flange 25 having an internally tapped surface 26 which is aligned with the tapped section 22 and having a second annular shoulder 28.

Positioned within the flange 25 and attached to the tapped surface 26 by means of threads 31, is an upstanding conductor tube or drain tube 30, provided throughout its length with a plurality of perforations 32 leading to a center hollow channel 33 in communication with the tapped section 22 and the bottom opening 20. On the extremity of the tube 30 remote from the bottom 12, there are placed a series of internal threads 34 holding coacting threads 41 positioned upon a stud 42 which is depended from a hold-down or sealing member 40. This member 40 consists of the stud 42 and a center cylindrical portion 43 holding at its upper extremity an upstanding rod 45, forming with the cylindrical portion 43 an annular shoulder 46. Placed around this rod 45, upon the shoulder 46, is a lower solid washer 47, an annular resilient sealing washer 48, and an upper solid washer 49. The resilient washer 48, as shown in Fig. 1 of the drawing, projects beyond the outer extremities of the solid washers 47 and 49. The washer 49 is surmounted by a coil spring 50 bearing against it and surrounding the rod 45. The upper extremity of the spring 50 bears against a solid washer 53 placed around the rod 45 adjacent to a center shank 51 of a handle 52 projecting through an aperture 44 within the rod 45. The ends of this shank 51 preferably, but not necessarily, terminate in enlarged cylindrical grips 54.

Positioned upon the boss 21 is a deformable metallic sealing member or washer 60 of aluminum, tin, or the like, conforming closely to the shape of the shoulder 24, the upstanding flange 25, and the shoulder 28. As is shown in Figs. 1 and 6 of the drawing, this washer 60 consists essentially of an external flange 61, a center cylindrical or body portion 62, leading to an internal flange 63, which in turn comes to a cylindrical extremity 64. As is apparent in Fig. 1 of the drawing, this extremity 64 is adapted to closely fit around the external dimension of the drain tube 30 while body portion 62 fits tightly against the inner wall of the perforated tube 71 of the filler cartridge.

A second sealing member or washer 60' of the same configuration as the washer 60 and having the same parts as those of washer 60, is used in conjunction with the sealing member 40 with the cylindrical extremity 64 fitting around the cylindrical portion 43 of the sealing member 40, with the shoulder or flange 63 against the washer 47 and with the center body portion 62 engaged by the resilient washer 48.

Positioned around the drain tube 30 is a filter cartridge 70 possessing a perforated rigid interior tube 71, the terminal extremities of which are held tightly against the cylindrical central portions 62 of the washers 60 and 60′ and the ends of which are held against the flanges 61 of these same washers. Rigidly attached to the tube 71 of the filter cartridge 70 are terminal end walls 72 and 73 which, in turn, are permanently attached in the conventional manner to an outer cylindrical perforated wall 74. The mode of attachment of these end walls 72 and 73 to the center perforated tube 71 and the outer perforated wall 74 is of the type well known to the art. Thus, conventional modes; such as, for example, welding, soldering, or crimping, can be used for this purpose. The space between the walls 71, 72, 73 and 74 is filled with an appropriate filtering material such as for example, cotton, paper balls, or the like.

Within the end wall 72 there are placed diametrically opposed apertures 75, through which there project legs 81 of a bail handle 80 having a central handle portion 82. The legs 81 of this bail handle 80 are formed with specially designed hook elements 82a as is shown in Fig. 5 of the drawing as consisting of lower curved bodies 84 leading to upwardly projecting shanks 85 which form angles of less than 90° with the legs 81. The shanks 85 contain bent portions 86 at their upper extremities which, in turn, terminate in short straight shanks 87 which are positioned at approximately right angles to the shanks 81.

In normal use of the bail handle 80, it is disposed with the handle portion 82 flat against the end wall 72. For removal, however, this handle 82 is lifted to an upward position approximately at right angles to the end wall 72. When this is done, the portions of the bail handle 80 within the openings 75 assume the positions shown in Fig. 5 of the drawing with the shank portions 87 engaging the wall 72. Thus, when pressure is exerted upwardly by means of the handle 82, the bail 80 transmits this pressure to the wall 72, lifting the entire filter cartridge 70.

The particular bail construction shown in the drawings is particularly advantageous inasmuch as the terminal extremities of it may be inserted within appropriate apertures when its handle or outer portion is against a filter cartridge and snapped or pressed into place with a slight bending of the material surrounding these apertures so as to be locked into position in such a manner that they are incapable of being removed from the device without serious deliberate bending.

Adjacent to the top 16 of the housing 10 is a domed top cap 90 consisting of a center domed portion 91 connected to a cylindrical side wall 92 of approximately the same diameter as the side wall 11 of the housing 10. This side wall 92 can be dispensed with, if desired, but when this is done the top 90 must be formed of a stronger material than is normally employed. This side wall 92 leads to a flange assembly 93 which is bilaterally symmetrical to the flange assembly 13 containing curved portions 94 and 95 corresponding to the curved portions 14 and 15 previously discussed. Edges 97 and 17 of the curved portions 95 and 15 respectively are preferably formed so as to be of the same dimension and so as to fit extremely near to one another. Positioned between the curved portions 95 and 15 is an annular washer 99 of a resilient material; such as, for example, neoprene, rubber, or the like.

To aid in positioning the top 90, as well as to structurally reinforce the housing 10 it is normally preferred to place a cylindrical band 101 next to the inside of the wall 11, as shown in Fig. 1, so as to project out past the upper end 16 of the housing 10. The portion of this band 101 within the wall 11 is preferably formed with an outwardly extending bead 102 which bears against a corresponding bead 102′ formed within the wall 11. These beads can easily be formed together by a single operation. In addition to adding strength to the wall 11, they may be employed in conjunction with clamping elements (not shown) used in positioning the housing 10. The portion 103 of the band 101 projecting beyond the end 16 of the housing is preferably of slightly smaller diameter than the rest of the band 101 so as to fit easily within the top 90. This portion 103 also serves to aid in positioning the top 90.

As an aid to positioning the top 90, a central fastener 104 consisting of a central tube 105 projecting through an aperture 106 centrally located in the dome 91 can be employed. This tube 105 carries externally of the dome 91 an upstanding boss 107 and is provided with internally tapped threads 108 in the same area. A stud 109 is normally secured to these threads 108 to close this aperture. If desired, this stud can be replaced by a common pressure gauge communicating with the inside of the top 90 by means of a side aperture 115 in the tube 105. The lower extremity of the tube 105 is provided with slanting shoulders 116, as shown in Fig. 1, which are adapted to guide the beveled top of the rod 45 within the tube 105. If desired, all or part of the elements indicated in this paragraph can be omitted from a filter construction, although when used they are extremely advantageous.

The curved portions 15 and 95, during operation of the device, are normally held in fixed relationship to one another by a substantially cylindrical jointed band 110, having at least 3 segments 111, connected to one another, as will be more fully described. This band 110 consists of a substantially flat outer section 112 which is parallel to the wall 11 of the housing 10 and of slanting side walls 114 dependent from this section 112 and projecting toward the walls 11 and 92. Both of the side walls 114 are preferably straight and are positioned with respect to one another at an angle of less than 90° and preferably at about 45°.

As is shown in Fig. 1 of the drawings, the internal sides of these walls 114 engage the curved portions 15 and 95 during the use of the band 110 and as this band is tightened, by means which will be more fully explained later, the resilient washer 99 is compressed within these curved portions out into the area between the flanges 14 and 94 toward the filter cartridge 70 forming what may be termed a "caulked seal" between these two latter portions. Because the edges 17 and 97 of the curved portions 15 and 95 respectively are closely spaced to one another, there is little, if any, tendency for the resilient washer 99 to expand into the area between these edges 17 and 97. This compression is a direct result of the walls 114 tightening over the curved portions 15 and 95 with a wedging action as the effective radius of the band 110 is decreased. Preferably the sections 111 of the band 110 are formed so as to have a radius corresponding to the radius of the band 110 when this band is in the final sealing position.

The sections 111 of the band 110 are held with respect to one another during use of the device by jointed links 120, shown in Fig. 3 of the drawings, and a single adjustable link 130, as shown in Fig. 4 of the drawings. The jointed link 120 shown in Fig. 3 is attached to adjacent sections 111 by means of rivets 121 projecting through looped ears 122 formed by bands 123 attached as by welding to the sections 111. Both of the rivets 121 carry, externally of the looped ears 122, bars 125 which are free to turn about these rivets 121 enabling the sections 111 to be moved with respect to one another.

The adjustable link 130 employed with the invention consists of U-shaped members 131 having lower walls 132 attached to the walls 112 of adjacent sections 111 as by welding and having further upstanding side walls 133 which are parallel to one another and directed away from the walls 112. Positioned between the upstanding side walls 133 of the U-shaped members 131, away from the walls 112, are pivots 136 which may be common rivets. Positioned around both of these pivots 136 between walls 133 are hollow cylindrical bodies 137 leading to and integrally connected with rotatable cylindrical sections 138 and 139 respectively. In use of the device the sections 138 and 139 are connected to one another by means of a common cap screw 140 projecting through the cylindrical section 138 into the cylindrical section 139, where it is threaded into the internal tapped surface 140a. By virtue of the fact that the sections 138 and 139 are movable with respect to one another, it is extremely simple to insert and tighten the cap screw 140 forming a tight joint utilizing the washer 99 shown in the initial figure of the drawings. It is preferred that in the final assembled position of the band 110 the sections 138 and 139 are held against one another. When this is the case, there is no danger of (difficulty from) the band 110 being tightened to too great an extent.

We claim as our invention:

1. In a fluid filter: a housing having inlet and outlet ports, one of said ports comprising means defining a tubular passageway leading through a wall of said housing, said means including a stepped hollow boss in said housing having a first annular shoulder spaced inwardly from said wall, a portion of reduced diameter extending inwardly from said first shoulder terminating in a second annular shoulder, and a conductor tube of less diameter than said portion extending inwardly from said second shoulder and communicating with the hollow interior of said boss to provide said passageway; a filter cartridge having a perforated tube extending therethrough and having end faces adjacent the ends of said perforated tube, said tube having an internal diameter greater than said portion of reduced diameter but concentric thereto; and sealing means comprising a unitary body of metal having a cylindrical portion fitting tightly within said perforated tube between said perforated tube and said portion of reduced diameter and conforming closely to the shape of said portion of reduced diameter, a flange abutting said first annular shoulder and the end face of said filter cartridge directly opposed to said first shoulder, and an internal shoulder abutting said second annular shoulder and extending inwardly substantially to said conductor tube, said filter cartridge and conductor tube defining a flow path for fluid from said inlet port to said outlet port.

2. A fluid filter as defined in claim 1 wherein said unitary body of said sealing means is formed of deformable metal.

3. A fluid filter as defined in claim 1 wherein said sealing means includes a second cylindrical portion extending inwardly of said second shoulder and of a size to snugly receive said conductor tube.

4. A fluid filter as defined in claim 1 including: means in the other end of said perforated tube in sealing relation thereto and providing a flange overlying the end of the filter cartridge, said means defining an inner cylindrical surface and an annular shoulder therein facing said other end of said perforated tube; a first rigid washer abutting said last-named annular shoulder; a resilient washer overlying said first rigid washer; a second rigid washer overlying said resilient washer; a hold-down member extending through said washers and releasably secured to said conductor tube; and means on said member pressing said second rigid washer toward said first rigid washer whereby to radially expand said resilient washer into sealing engagement with said inner cylindrical surface.

5. A fluid filter as defined in claim 4 wherein said hold-down member comprises a rod threadedly engaged with said conductor tube and handle elements extending laterally of said rod, said last-named means comprising a compression spring around said rod between said handle elements and said second rigid washer.

6. In a fluid filter: a housing having inlet and outlet ports, one of said ports being defined by a hollow boss rigid with said housing and projecting inwardly therefrom, said boss having an inwardly facing annular shoulder; a filter cartridge having an open-ended perforated tube extending therethrough, said cartridge providing upper and lower end faces at the open ends of said perforated tube, said annular shoulder being of greater outer diameter than the inner diameter of said perforated tube and providing a surface facing said lower end face; upper and lower sealing members each providing a cylindrical portion fitting respectively tightly within the open ends of said perforated tube, each sealing member having an outwardly extending flange at one end of its cylindrical portion extending outwardly at a position to overlie the corresponding one of said end faces and each sealing member having an inwardly extending flange at the other end of said cylindrical portion at a position a substantial distance inwardly of the open ends of said perforated tube, each inwardly extending flange providing an opening, the outwardly extending flange of said lower sealing member being disposed between and abutting said lower end face and said surface of said shoulder; a conductor tube secured rigidly to said hollow boss and providing a fluid-receiving and fluid-conducting internal flow path opening on said one of said ports, said conductor tube providing a threaded upper end terminating at a position between the ends of said perforated tube, said openings of said inwardly extending flanges being of a size to receive and slide over the exterior of said conductor tube; and a hold-down unit in the upper part of said housing, said hold-down unit including a rod threaded at its lower end to said threaded upper end of said conductor tube whereby turning of said rod lowers it toward said hollow boss, said hold-down unit including upper and lower rigid washers with a resilient washer therebetween, said washers surrounding said rod, said lower washer providing a lower surface overlying and exerting a downward pressure on the upper surface of one of said flanges of said upper sealing member, said hold-down unit including a spring surrounding said rod and compressed against said upper washer to force it toward said lower washer and thus compress said resilient washer therebetween, said lowering of said rod resulting from said turning thereof increasing said downward pressure exerted by said lower washer on said one of said flanges to force said perforated tube downwardly to compress said outwardly extending flange of said lower sealing member between said lower end face and said surface of said shoulder, said filter cartridge and its perforated tube defining a flow path for fluid from said inlet port to said outlet port.

7. In a fluid filter having a housing provided with inlet and outlet ports: a filter cartridge having a perforated tube extending therethrough and aligned with said outlet port, said filter cartridge having end faces adjacent the ends of said perforated tube, said outlet port being defined by a hollow boss rigid with said housing and projecting inwardly therefrom, said boss having an inwardly facing annular shoulder of greater outer diameter than the inner diameter of said perforated tube, said boss having a vertical portion of a diameter less than the inside diameter of said perforated tube extending inwardly from said annular shoulder and centrally into the adjacent end of said perforated tube, a first metal sealing member fitting tightly within the end of said perforated tube in the annular space between said portion of said boss and the inside of said perforated tube and conforming closely to the shape of said portion of said boss, said sealing member having an outwardly extending flange abutting said annular shoulder and the end face of said filter cartridge directly opposed to said shoulder; and hold-down means in said housing pressing said perforated tube toward said boss and placing said flange under compression between the opposed surfaces of said annular shoulder and the end face of said filter cartridge, said hold-down means including means responsive to hold-down pressure closing and sealing the other end of said perforated tube, said cartridge and its perforated tube defining a flow path for fluid from said inlet port to said outlet port.

8. A fluid filter as defined in claim 7 including a conductor tube extending from said boss along the axis of said perforated tube toward the other end thereof, a second sealing member comprising a hollow cylindrical portion in the other end of said perforated tube, said second sealing member having a flange engaging the other end face of said filter cartridge, said hold-down means comprising a hold-down rod threadedly engaging said conductor tube axially inwardly of said second sealing member, a pair of rigid washers with a resilient washer therebetween surrounding said rod within said hollow cylindrical portion of said second sealing member, means holding the innermost rigid washer in fixed relation to said second sealing member, and means on said rod engaging the outer rigid washer and pressing it toward the innermost rigid washer to press said second sealing member and perforated tube toward said first sealing member and boss and to simultaneously radially expand said resilient washer into sealing engagement with the inner surface of the hollow cylindrical portion of said second sealing member.

9. A fluid filter as defined in claim 8 wherein said means on said rod comprises a compression spring surrounding said rod outwardly of said washers, the inner end of said spring bearing against said outer rigid washer and the outer end thereof bearing against a transverse abutment fixed on said rod.

References Cited in the file of this patent

UNITED STATES PATENTS

| | | |
|---|---|---|
| 628,057 | Williamson | July 4, 1899 |
| 771,971 | Davidson | Oct. 11, 1904 |
| 815,983 | Sherman | Mar. 27, 1906 |
| 1,290,590 | Lehew | Jan. 7, 1919 |
| 1,376,216 | Mittinger | Apr. 26, 1921 |
| 1,463,006 | Dardani | July 24, 1923 |
| 1,608,197 | Bille | Nov. 23, 1926 |
| 2,028,062 | Goldman | Jan. 14, 1936 |
| 2,134,385 | Winslow | Oct. 25, 1938 |
| 2,218,800 | Williams | Oct. 22, 1940 |
| 2,306,099 | Wiepert | Dec. 22, 1942 |
| 2,345,849 | Winslow et al. | Apr. 4, 1944 |
| 2,347,384 | Winslow et al. | Apr. 25, 1944 |
| 2,352,732 | Nugent | July 4, 1944 |
| 2,478,109 | Kamrath | Aug. 2, 1949 |
| 2,511,800 | Wilkinson | June 13, 1950 |
| 2,533,266 | Kovacs et al. | Dec. 12, 1950 |
| 2,543,481 | Wicks et al. | Feb. 27, 1951 |
| 2,584,771 | Wilkinson | Feb. 25, 1952 |
| 2,597,770 | Alexander | May 20, 1952 |
| 2,626,057 | Clabaugh | Jan. 20, 1953 |
| 2,627,350 | Wicks | Feb. 3, 1953 |
| 2,636,663 | Hauck | Apr. 28, 1953 |
| 2,647,637 | Leet | Aug. 4, 1953 |
| 2,667,271 | Tursky | Jan. 26, 1954 |

FOREIGN PATENTS

| | | |
|---|---|---|
| 111,195 | Great Britain | Nov. 22, 1917 |
| 188,059 | Great Britain | Oct. 30, 1922 |
| 533,576 | Great Britain | Feb. 17, 1941 |